United States Patent
Bratkovski

(10) Patent No.: US 7,359,111 B1
(45) Date of Patent: Apr. 15, 2008

(54) OPTICAL STEERING DEVICE AND METHOD

(75) Inventor: Alexandre M. Bratkovski, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/651,315

(22) Filed: Jan. 8, 2007

(51) Int. Cl.
   *G02F 1/35* (2006.01)
   *G02F 2/02* (2006.01)
(52) U.S. Cl. .................................. 359/326; 359/332
(58) Field of Classification Search ........ 359/326–332; 372/21
See application file for complete search history.

(56) References Cited

U.S. PATENT DOCUMENTS

2007/0263278 A1* 11/2007 Chowdhury et al. ........ 359/332

* cited by examiner

*Primary Examiner*—Hemang Sanghavi

(57) ABSTRACT

An optical device for steering radiation comprises a superprism structure a negative index of refraction for electromagnetic radiation having a frequency of $2\omega$ only, and a photon upconversion structure disposed to upconvert a portion of incident electromagnetic radiation having a frequency of $\omega$ to electromagnetic radiation having a frequency of $2\omega$ and to couple a portion of the incident electromagnetic radiation having a frequency $\omega$ and the upconverted electromagnetic radiation having a frequency of $2\omega$ into the superprism structure.

20 Claims, 4 Drawing Sheets

OPTICAL STEERING DEVICE AND METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The invention relates generally to light steering, and particularly to methods and devices for reducing the physical size of light steering devices.

2. Description of Related Art

In optical communication systems, especially on-chip integrated systems, it is desirable to miniaturize the light steering devices. Currently such devices are physically considerably larger than $\lambda$, the wavelength of the steered radiation (light). The fundamental physics of conventional lenses, which create images by capturing propagating light waves reflected by objects and then bending them, limit them to a resolution on the order of $\lambda$ due to the so called diffraction limit. The angle of the bend is determined by the index of refraction and is always positive in common lenses. However, objects also emit "evanescent" waves that carry a great deal of detail (specifically, about object features on a sub-wavelength scale $<\lambda$) but are far more elusive because they decay exponentially away from the source and thus never reach the image plane of a lens, and this leads to the diffraction limit.

The recent advent of artificial structures with electromagnetic resonances has enabled the development of negative index metamaterials (NIMs). NIMs are materials for which both the electric permittivity E and the magnetic permeability $\mu$ are simultaneously negative ($\epsilon<0$, $\mu<0$). Such materials have not been found to exist in nature, but can now be fabricated by combining artificially magnetic structures with artificial electric structures. Because the refractive index N of these materials is positive, they are in fact transparent to light and, by being formed with a structure on the order of $\lambda$ or smaller, can be used for near-field "superlensing"—that is, focusing features much smaller than the wavelength $\lambda$ of the light that they are focusing.

Recently, it has been shown that dielectric photonic crystals (PhCs) also can possess negative refraction. Photonic crystals are periodic optical nanostructures composed of periodic dielectric or metallo-dielectric nanostructures that are designed to affect the propagation of electromagnetic waves (EM) by defining allowed and forbidden electronic energy bands (forming so-called photonic band gaps when the unit cell size is comparable to integers of the EM wavelength in the material) and giving rise to certain desirable optical phenomena including inhibition of spontaneous emission, high-reflecting omni-directional mirrors (such as Bragg mirrors) and low-loss-waveguiding. Because of necessarily strong variation of optical index in the unit cell (in other words, strong spatial dispersion) some PhCs exhibit negative refraction which is a very strong effect, with experiments having shown that the incident light angle between the normal to the surface of a PhC can be as small as 7° while the angle of refraction can be as large as 70°. It has also been demonstrated that a slab of PhC may enable an effective free space transmission of light between fibers with separation comparable to $\lambda$.

The present writing addresses the need for reducing the size of light steering devices by utilizing the superlensing optical properties of NIM PhCs.

BRIEF SUMMARY

This disclosure generally provides for, in one embodiment, an optical device comprising a superprism structure having a positive index of refraction for electromagnetic radiation having a frequency of $\omega$ and a negative index of refraction for electromagnetic radiation having a frequency of $2\omega$, and a photon upconversion structure disposed to upconvert a portion of incident electromagnetic radiation having a frequency of $\omega$ to electromagnetic radiation having a frequency of $2\omega$ and to couple a portion of the incident electromagnetic radiation having a frequency $\omega$ and the upconverted electromagnetic radiation having a frequency of $2\omega$ into the superprism structure.

In another embodiment, a method of directing electromagnetic radiation comprises selecting a superprism structure having a positive index of refraction for electromagnetic radiation having a frequency of $\omega$ and a negative index of refraction for electromagnetic radiation having a frequency of $2\omega$, disposing a photon upconversion structure to upconvert a portion of incident electromagnetic radiation having a frequency of $\omega$ to electromagnetic radiation having a frequency of $2\omega$ and to couple a portion of the incident electromagnetic radiation having a frequency $\omega$ and the upconverted electromagnetic radiation having a frequency of $2\omega$ into the superprism structure, and supplying electromagnetic radiation having a frequency of $\omega$ into the photon upconversion structure.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings in this specification should be understood as not being drawn to scale unless specifically annotated as such.

DETAILED DESCRIPTION

The present writing addresses the need for minimizing the size of light steering devices by employing the superlensing properties of NIM PhCs. Frequently, quantum communication devices use pairs of down-converted photons ($\omega \rightarrow \omega/2$). In certain cases it may be advantageous to start with a standard communications frequency such as photons with $\lambda = 1.5$ µm and up-covert them to 750 nm photons and use an entangled pair of up-converted photons with a frequency $2\omega$. Upconversion may in fact be used to produce visible light from infra-red light (IR). Because the superprism effect realized by specific NIM PhCs is a property tied to a particular frequency of the incident light, a PhC that acts as a superprism at $2\omega$ but not at $\omega$ can be constructed. The upconversion of photons from $\omega$ to $2\omega$ may be achieved as a result of interaction of the incident light with ferroelectric (FE) or nonlinear optical organic material, as well known in the art, although any other practicable upconversion mechanisms are contemplated for use within the presently disclosed embodiments and the embodiments described below specifically employ FE material for photon upconversion solely for ease of illustration and discussion.

Figure 1:
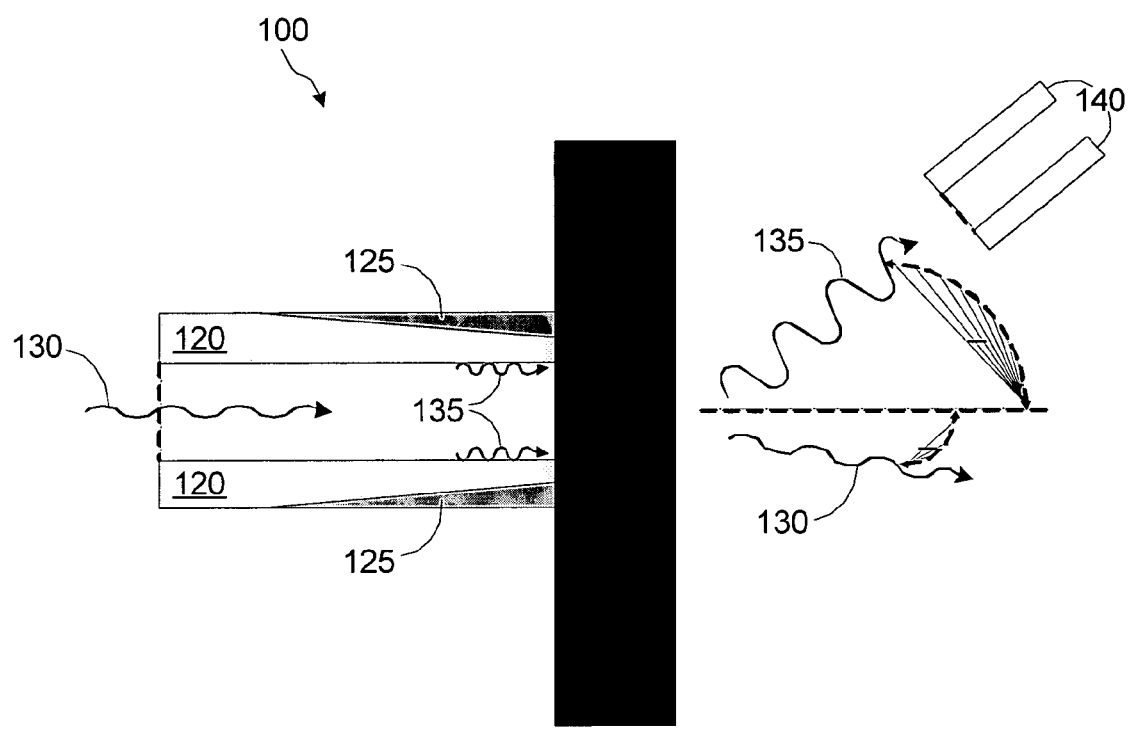
FIG. 1 is a schematic depiction of one embodiment of an optical device in accordance with the present disclosure.

Thus, with reference to FIG. 1, an embodiment of an optical steering device 100 according to the present writing includes a "superprism" NIM PhC 110, that is, a photonic crystal having negative electric permittivity $\epsilon$ and negative magnetic permeability $\mu$ ($\epsilon < 0$, $\mu < 0$). The PhC 110 is formed with a thickness necessary to behave as a NIM for incident light having a selected frequency $2\omega$, which could typically be on the order of 2-10$\lambda$. Coupled to the PhC 110 is an optical fiber 120 for conducting incident light 130 having wavelength $\omega$ to impinge onto a surface of PhC 110. In this embodiment the optical fiber 120 is formed with FE material insertion 125 in its wall. The insertion may be on the outer perimeter of the fiber, as shown in FIG. 1, or may be disposed internally along the inner surface of the wall for greater upconversion efficiency. As the incident light 130 travels through the optical fiber, its evanescent field penetrates into the wall of the optical fiber and into the FE material insertion to induce upconversion and emit light 135 at twice the frequency $2\omega$. Both the incident light with frequency $\omega$ and the upconverted light with frequency $2\omega$ eventually impinge onto the PhC 110 wherein, due to the superprism properties of the PhC, the evanescent field that has been upconverted to $2\omega$ is diffracted at a negative angle $\theta$ whereas the incident light at frequency $\omega$ is diffracted at a positive angle $\phi$. The two beams of light 130, 135 are thus split and individually steered at very specific angles $\theta$, $\phi$, thereby enabling coupling of the evanescent field into a receiving optical fiber 140. The angle of incidence of the fiber is shown as 90° only as an illustration and in practice the angle of incidence may be set at any practicable value. It must be noted that this angle may be changed dynamically by moving either the fiber or the PhC with respect to one another, thereby potentially allowing the use of the same PhC to steer incident light having different frequencies $\omega_1$, $\omega_2$, $\omega_3$, etc.

Figure 2:
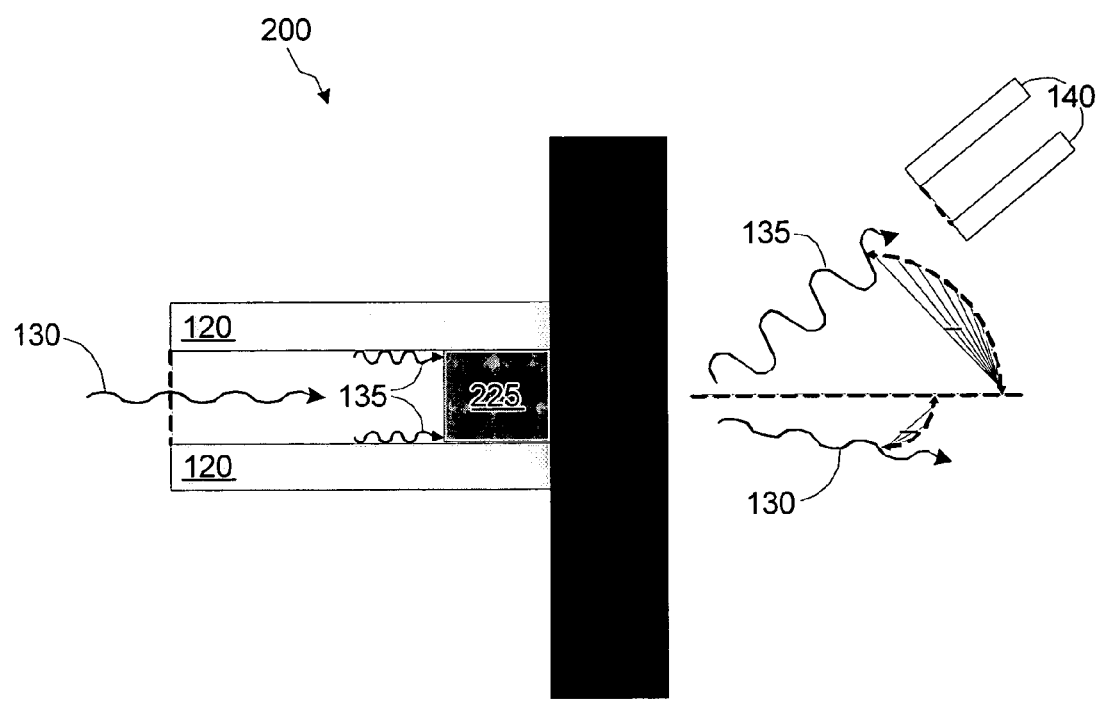
FIG. 2 is a schematic depiction of another embodiment of an optical device in accordance with the present disclosure.

In another possible embodiment illustrative of the novel and inventive concepts disclosed herein, shown in FIG. 2, an optical steering device 200 has the FE material 225 relied upon for upconverting the evanescent field photons placed within the transmission path itself of optical fiber 120 so that all of the transmitted light 130 as well as its evanescent field 135, both at frequency $\omega$, impinge onto the FE material and pass through to subsequently impinge onto the PhC 110 as incident light field 130 and upconverted light field 135. As will readily be appreciated by the skilled reader, in contrast with the embodiment of FIG. 1, the embodiment of FIG. 2 is likely to produce more backscattering of the incident light 130 due to the FE material completely occupying its path.

Figure 3:
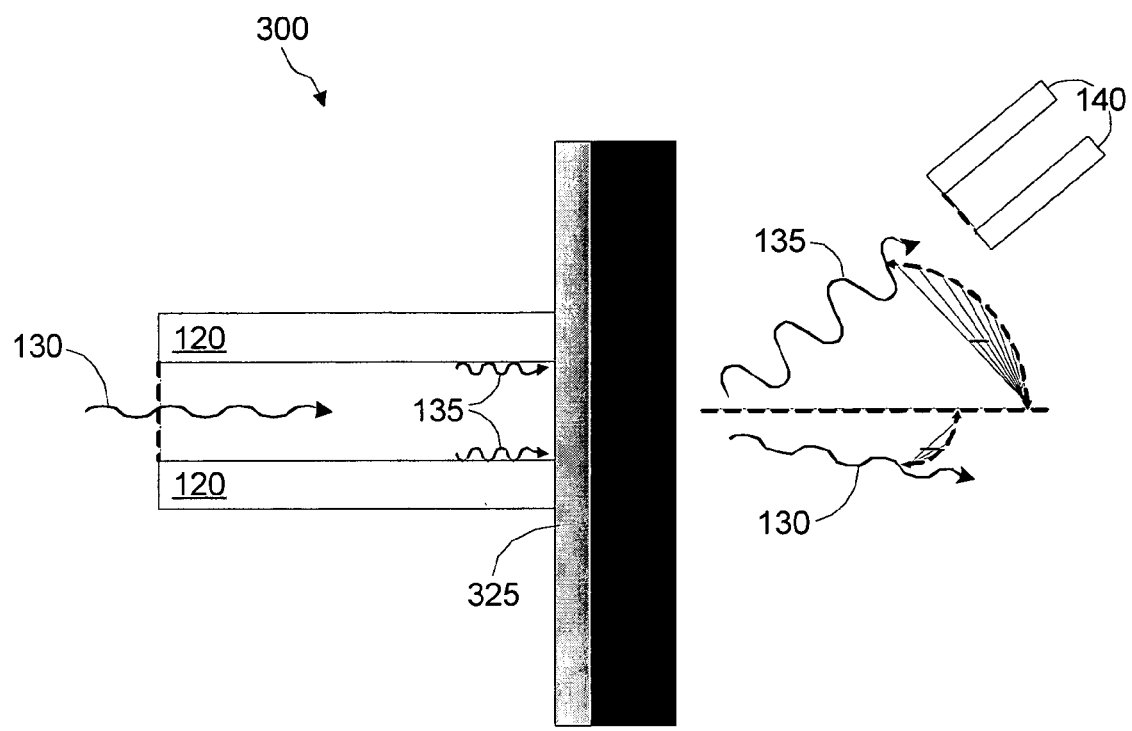
FIG. 3 is a schematic depiction of another embodiment of an optical device in accordance with the present disclosure.

In yet another alternative and non-limiting embodiment, as shown in FIG. 3, an optical steering device 300 has the FE material 325 relied upon for upconverting the evanescent field photons deposited onto the incident surface of the PhC 110. This embodiment is functionally identical to the embodiment of FIG. 2 but, as the skilled reader will appreciate, offers different manufacturing challenges.

Figure 4:
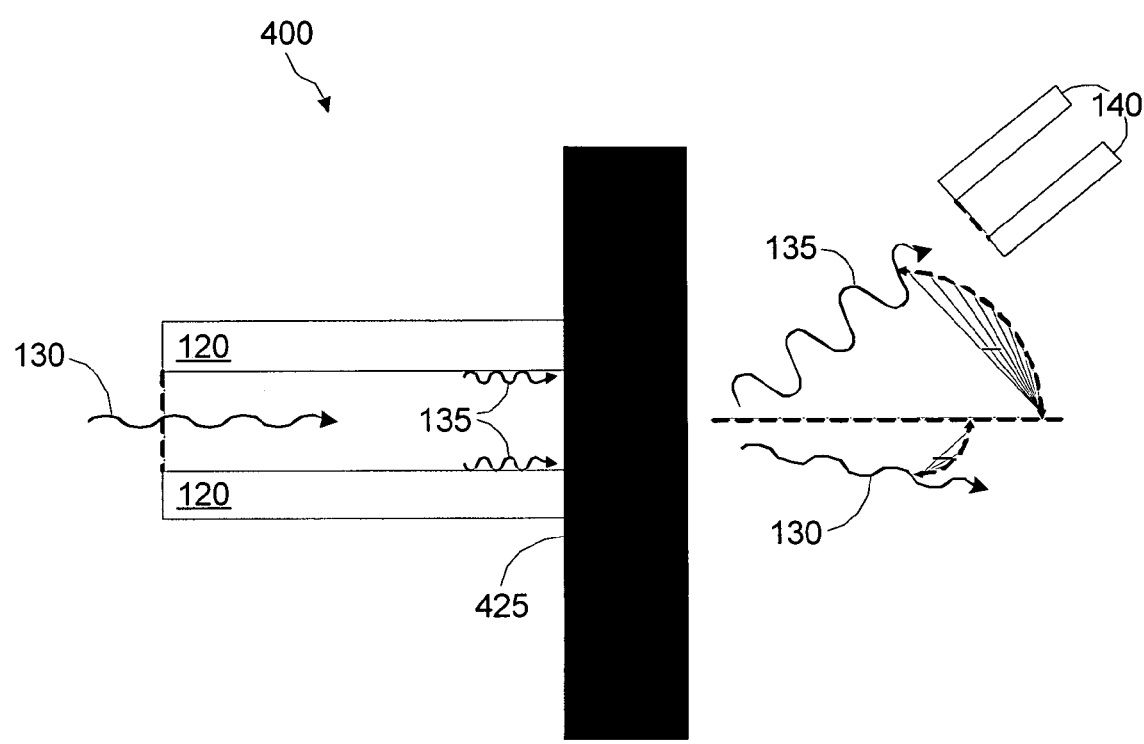
FIG. 4 is a schematic depiction of another embodiment of an optical device in accordance with the present disclosure.

A final illustrative, non-limiting embodiment is shown in FIG. 4, wherein an optical steering device 400 includes a PhC 410 comprised of FE material that is joined to the incident surface of the superprism PhC 110 to upconvert an incident evanescent field 135, in a manner similar to that described above. In an alternative embodiment not shown in the figures, FE material may be inserted into holes fabricated in the PhC 110 to thereby both produce a high dielectric contrast PhC as well as provide structural strength to the PhC.

It is important to understand that the novel and inventive concepts disclosed herein center on the recognition that NIM can be used to efficiently steer light by forming them into structures that behave as superprisms for a selected frequency but not for other frequencies. Thus, although the above embodiments have all been described with reference to a PhC forming the superprism structure, the invention is in no way limited to the use of PhCs and the use of any NIM as the superprism is contemplated within the scope of the presently claimed invention. Furthermore, the upconversion mechanism is not limited to the use of FE material but rather to any mechanism practicable within the bounds of the invention as defined by the appended claims.

The skilled reader will appreciate that there are many possible uses for the novel approaches described herein for controlling the direction of radiation propagation. These uses include manufacturing a new class of sub-$\lambda$ optical integrated circuits and optical networks, as well as a wide array of ultra-compact sensors (heat, motion, etc.) based on the well-known fact that the negative refraction property of superprisms is very sensitive to physical deformation of the crystal. Optical circuits may employ electro-striction of the FE material (that is, deformation of the FE material by applying a bias voltage or stress) to modulate a signal transmitted by the upconverted photons. Optical circuits built in accordance with the present writing could also employ a birefringent crystal disposed in the receiving optical fiber 140 to produce pairs of entangled upconverted photons that have use in quantum data processing.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. An optical device, comprising:
    a superprism structure having a positive index of refraction for electromagnetic radiation having a frequency of $\omega$ and a negative index of refraction for electromagnetic radiation having a frequency of $2\omega$; and
    a photon upconversion structure disposed to upconvert a portion of incident electromagnetic radiation having a frequency of $\omega$ to electromagnetic radiation having a frequency of $2\omega$ and to couple a portion of the incident electromagnetic radiation having a frequency $\omega$ and the upconverted electromagnetic radiation having a frequency of $2\omega$ into the superprism structure.

2. The optical device of claim 1, further comprising:
    an input optical fiber disposed to guide electromagnetic radiation having a frequency of $\omega$ into the photon upconversion structure.

3. The optical device of claim 2, wherein the photon upconversion structure comprises ferroelectric material.

4. The optical device of claim 3, wherein the photon upconversion structure is disposed within the guiding path of the input optical fiber.

5. The optical device of claim 3, wherein the photon upconversion structure is disposed within the wall of the input optical fiber.

6. The optical device of claim 1, wherein the photon upconversion structure comprises ferroelectric material.

7. The optical device of claim 6, wherein the photon upconversion structure is disposed between the input optical fiber and the superprism structure.

8. The optical device of claim 7, wherein the photon upconversion structure comprises a slab of ferroelectric material disposed onto the superprism structure.

9. The optical device of claim 8, wherein the photon upconversion structure comprises a photonic crystal.

10. The optical device of claim 2, wherein the superprism structure comprises a photonic crystal.

11. The optical device of claim 2, further comprising:
    an output optical fiber disposed to receive electromagnetic radiation having a frequency of $2\omega$ refracted by the superprism structure.

12. A method of directing electromagnetic radiation, comprising:
    selecting a superprism structure having a positive index of refraction for electromagnetic radiation having a frequency of $\omega$ and a negative index of refraction for electromagnetic radiation having a frequency of $2\omega$;
    disposing a photon upconversion structure to upconvert a portion of incident electromagnetic radiation having a frequency of $\omega$ to electromagnetic radiation having a frequency of $2\omega$ and to couple a portion of the incident electromagnetic radiation having a frequency $\omega$ and the upconverted electromagnetic radiation having a frequency of $2\omega$ into the superprism structure; and
    supplying electromagnetic radiation having a frequency of $\omega$ into the photon upconversion structure.

13. The method of claim 12, further comprising:
    receiving electromagnetic radiation having a frequency of $2\omega$ refracted by the superprism structure.

14. The method of claim 12, wherein the photon upconversion structure comprises ferroelectric material.

15. The method of claim 14, wherein the photon upconversion structure is disposed within the guiding path of the input optical fiber.

16. The method of claim 14, wherein the photon upconversion structure is disposed within the wall of the input optical fiber.

17. The method of claim 14, wherein the photon upconversion structure is disposed between the input optical fiber and the superprism structure.

18. The method of claim 14, wherein the photon upconversion structure comprises a slab of ferroelectric material disposed onto the superprism structure.

19. The method of claim 18, wherein the photon upconversion structure comprises a photonic crystal.

20. The method of claim 12, wherein the superprism structure comprises a photonic crystal.

* * * * *